United States Patent [19]

Stoev et al.

[11] 4,379,714

[45] Apr. 12, 1983

[54] METHOD FOR REGULATING THE GRANULOMETRIC CHARACTERISTIC OF THE COMPONENTS IN METALLURGICAL SLAGS

[75] Inventors: Stoycho M. Stoev; Shtelyana D. Dshendova; Kiril N. Stoyanov; Raycho V. Dochev, all of Sofia; Tzvetan P. Krestev, Vratza, all of Bulgaria

[73] Assignee: Vish-Minnogeoloshki Institute, Sofia, Bulgaria

[21] Appl. No.: 332,255

[22] Filed: Dec. 18, 1981

Related U.S. Application Data

[63] Continuation-in-part of Ser. No. 198,621, Oct. 20, 1980, abandoned.

[51] Int. Cl.$^3$ .............................................. C03B 5/18
[52] U.S. Cl. .......................................... 65/19; 75/24; 75/63; 209/5; 209/11; 210/738

[58] Field of Search ....................... 209/5, 11; 210/738, 210/773; 65/19; 75/24, 63

[56] References Cited

U.S. PATENT DOCUMENTS

| | | | |
|---|---|---|---|
| 2,790,762 | 4/1957 | Heyman | 210/738 |
| 3,537,695 | 11/1970 | Robinson et al. | 210/773 X |
| 3,544,310 | 12/1970 | Terado et al. | 75/24 X |
| 4,046,323 | 9/1977 | McKerrow et al. | 65/19 X |
| 4,083,717 | 4/1978 | Lenoir et al. | 65/19 X |

*Primary Examiner*—Robert L. Lindsay, Jr.

[57] ABSTRACT

A method for regulating the granulometric characteristics of the components in metallurgical slags comprising the step of imparting a vibration to the slag, after the separation of the slag from the metallurgical furnace while the slag is being cooled. The imparted vibration frequency and amplitude is adjustable and ranges respectively from 12 to 100 Hz and 0.2 to 5 mm and when circular vibration is imparted from 0.4 to 12 mm.

3 Claims, No Drawings

METHOD FOR REGULATING THE GRANULOMETRIC CHARACTERISTIC OF THE COMPONENTS IN METALLURGICAL SLAGS

This application is a continuation-in-part of application Ser. No. 198,621, filed Oct. 20, 1980, now abandoned.

BACKGROUND OF THE INVENTION

This invention relates to a method for regulating the granulometric characteristic of the components in metallurgical slags, which is used for obtaining preselected sizes of the metallic inclusions which are selected so that the slag is suitable for subsequent treatment and concentration. One of the objects of known methods for treating metallurgical slags is to increase the size of the metallic inclusions. In such known method the slags are poured on crystallization fields and are cooled at a rate of several degrees per hour. In such delayed cooling the metallic inclusions retain a sufficient mobility, so that they can move to aggregate to the desired size. After solidification the slags are broken into pieces of preset size and are ground up, and are then subjected to a floatation treatment for the separation of the metal particles.

A drawback of these methods lies in that, in spite of the prolonged and regulated time of cooling of the slag, its granulometric composition is formed comparatively arbitrarily, and at that a large portion of the metallic inclusions are not aggregated to the necessary size, and thus during floatation they are not recovered from the slag. Another drawback lies in the requirement of large open areas for the pieces, and the regulating of the rate of cooling which is difficult because of the influence of different climatic and meteorologic factors.

There are also known methods for impoverishment of metallurigical slags, in which the vessel holding the slag or the slag itself are subjected to the action of vibration using either horizontal or vertical vibrations. The heavy metallic phase is separated from the bottom portion of the vessel, while the impoverished slag remains on the surface and is thrown out.

The object of all these methods lies only in impoverishing the slag by direct recovery of the metal from it. The necessity of prolonged vibrations for a total recovery of the metal makes these methods inefficient from a viewpoint of the consumed energy and materials. The reduction of the duration of vibrations leads to the loss of valuable metal together with the slag.

SUMMARY OF THE INVENTION

It is a general object of this invention to provide a method for regulating the granulometric characteristic of the components in metallurgical slags by accelerating the process of size increase of the metallic inclusion by their aggregation to an optimum size with regard to a next-following floatation or other concentration treatment.

This object is achieved by a method in which, after the separation of the slags from the metallurgical furnace and during its natural cooling, it is subjected to the regulated action of vibrations with a frequency from 10 to 150 Hz and an amplitude from 0.2 to 5 mm or an average vibrational radius in circular vibration of 0.4 to 12 mm. In this case, there are added periodically to the gravitational force of the metallic inclusions combined vibrational force impulses, which in the cycle of addition are in a state to accelerate their motion by imparting to them a greater kinetic energy. And as a result the metallic inclusions increase in size. In the cycle of subtraction of the vibrational force impulse from the gravitational force, the resulting force component is not in a state to destroy the produced large-size particles. As a result of the afore-described multiple action, for a predetermined time, there is obtained the necessary granulometric characteristic of the components of the slag. The motion of the metallic inclusions is also facilitated by the reduced viscosity produced by vibration as a result of which there is formed a diffuse acoustic field in the slag. The components of this field, which contribute to the formation of standing waves, contribute additionally to the size enlargement, and to the motion of the metallic inclusions in different directions and thereby facilitates the movements for aggregation. In the case of different minerals with different temperatures of solidification, the vibrations intensify their distribution in different areas, thus favoring the next-following breaking and grinding of the slag.

The advantage of the method of this invention lies in that the granulometric enlargement of the metallic inclusions in the slags is effected during a short period of time when there is reached their optimum size for the needs of a next-following floatation and concentration treatment. The process of the invention also makes possible the recovery of a considerable portion of the metal contained within the slags, thus improving the technical and economic characteristics.

The method of the invention will be explained by means of the following examples:

EXAMPLE 1

Waste slag with a copper content of 0.46 wt.% is subjected to vibrational action during 3 minutes at a vibration frequency of 100 Hz and amplitude of 0.2 mm. The temperature of the liquid slag is 1200° C. A microscopic investigation of polished samples of solidified slag indicates that the predominating sizes of metallic splashes is about 70 to 80 microns. The 100 to 40 micron class size is within the quantitative limits of 55 to 65%, while the 40 to 0 micron class size is on the average represented by about 15%. The remaining part of the copper-containing splashes is in the 200 to 100 microns range, while a negligible quantity reaches a size of 400 microns. Only single splashes are of greater size. These data show, that the obtained granulometric composition is quite suitable for floatation concentration. Such a granulometric composition can be reached by the thermocooling method used currently only with delayed cooling for more than 10 hours. Hence, the vibrational method of the invention effects an acceleration of the preparation of the slag for a next-following concentration which is a multiple of the preparation time of conventional methods. In floatational concentration of the vibrated slag, only by one operation there is obtained 5.2% copper concentrate at a recovery of copper equal to 68%. Similar slag, cooled in air under the same conditions of floatation makes it possible to obtain concentrate containing 3% copper at a recovery of 36%. If the slag is cooled by water and then ground and floated under the same conditions, the results are still worse—the contents of copper in the concentrate is 1.25% with a copper recovery of 21%. Thus, the vibration of slags allows not only the shortening considerably of the time for obtaining an appropriate granulometric composition, but also achieves considerably better technical-economical results.

EXAMPLE 2

Converter slag is subjected to vibrational action at a frequency of 100 Hz, and vibration amplitude of 0.3 mm and duration of the treatment 10 minutes. The macro- and microscopic investigation of polished samples shows the presence of metallic splashes of 6 mm size. Individual grains are of larger size. In fact, the quantity of the 6 to 1 mm class is about 35%, of the 1 to 0.2 mm class on the average about 45%, and the splashes of size smaller than 0.2 mm about 20%. Hence, there is obtained a typical granulometric composition which permits the processing of the cooled slag after revealing the components by combined gravitational scheme, for example jigs for granulometric class above 1 mm and concentration tables for the product below 1 mm. The obtaining of large-size concentrate and waste has a number of advantages for the next-following processes of utilization.

The device for imparting the vibrations to the slag may be of the type disclosed in out copending application Ser. No. 198,861, filed Oct. 18, 1980, now abandoned and entitled DEVICE FOR THE VIBRATION OF SLAGS.

Although the invention is described with reference to a plurality of preferred embodiments thereof, it is to be expressly understood that it is in no way limited to the disclosure of such a plurality of embodiments, but is capable of numerous modifications within the scope of the appended claims.

What is claimed is:

1. A method for regulating the granulometric characteristics of the components in metallurgical slags, comprising the step of subjecting the slag, after the separation of the slag from a metllurgical furnace and during its cooling, to an adjustable vibration action having a frequency of from 12 to 100 Hz and an amplitude from 0.2 to 5 mm or having an average vibrational radius in circular vibration from 0.4 to 12 mm, whereby rapidly to increase the particle size of the metallic inclusions in the slag.

2. The method according to either claim 1, wherein after separation of the slag from the furnace and before the vibration and cooling of the slag the predominant sizes of metal inclusions therein is from about 70 to 80 microns.

3. The method according to either claim 1, wherein the metallurgical slag is a copper slag.

* * * * *